US011079905B2

(12) United States Patent
Lange

(10) Patent No.: US 11,079,905 B2
(45) Date of Patent: Aug. 3, 2021

(54) COMPUTER SYSTEM FOR ASSEMBLING GRAPHICAL USER INTERFACES FROM DYNAMIC DATA

(71) Applicant: Marketing Architects, Inc., Minneapolis, MN (US)

(72) Inventor: Aaron Lange, Eden Prairie, MN (US)

(73) Assignee: Marketing Architects, Inc., Minneapolis, MN (US)

( * ) Notice: Subject to any disclaimer, the term of this patent is extended or adjusted under 35 U.S.C. 154(b) by 0 days.

(21) Appl. No.: 16/986,774

(22) Filed: Aug. 6, 2020

(65) Prior Publication Data

US 2020/0363917 A1    Nov. 19, 2020

Related U.S. Application Data

(63) Continuation of application No. 16/368,549, filed on Mar. 28, 2019, now Pat. No. 10,802,678.

(60) Provisional application No. 62/655,528, filed on Apr. 10, 2018.

(51) Int. Cl.
   *G06F 3/0482*     (2013.01)
   *G06F 3/0484*     (2013.01)
(52) U.S. Cl.
   CPC .......... *G06F 3/0482* (2013.01); *G06F 3/0484* (2013.01)
(58) Field of Classification Search
   CPC .............................. G06F 3/0482; G06F 3/0488
   See application file for complete search history.

(56) References Cited

U.S. PATENT DOCUMENTS

| 2013/0018869 | A1  | 1/2013 | Hanson et al. |
| 2013/0024910 | A1  | 1/2013 | Verma et al. |
| 2014/0025692 | A1  | 1/2014 | Pappas |
| 2014/0089816 | A1* | 3/2014 | DiPersia ............... G06F 3/0484 715/753 |
| 2014/0136521 | A1  | 5/2014 | Pappas |

(Continued)

OTHER PUBLICATIONS apprise-mobile.com [online], "Products," 2019, [retrieved on Apr. 26, 2019], retrieved from: URL <https://apprise-mobile.com/products/>, 1 pages.

(Continued)

*Primary Examiner* — Tadesse Hailu
(74) *Attorney, Agent, or Firm* — Fish & Richardson P.C.

(57) ABSTRACT

A server is configured to receive, from a first user device, information for a debrief-object. The server is further configured to generate a debrief-object from the information for a debrief-object. The server is further configured to generate a post-object containing the debrief-object. The server is further configured to associate the generated post-object with a newsfeed-object that contains a plurality of other post-objects. The server is further configured to generate an interface to render the newsfeed-object such that the generated post-object and the other post-objects are displayed in an order other than the chronological order created. The server is further configured to serve, to a second user device, the interface. The first user device is configured to transmit, to the server, the information for the debrief-object. The second user device is configured to display the newsfeed-object such that the generated post-object and the other post-objects are displayed in another order.

20 Claims, 10 Drawing Sheets

(56) References Cited

U.S. PATENT DOCUMENTS

| | | | | |
|---|---|---|---|---|
| 2014/0250114 | A1* | 9/2014 | Piantino | G06F 3/04847 707/725 |
| 2014/0317184 | A1* | 10/2014 | Weaver | G06Q 10/10 709/204 |
| 2015/0081449 | A1* | 3/2015 | Ge | G06Q 30/0269 705/14.66 |
| 2015/0113434 | A1 | 4/2015 | Lineberger et al. | |
| 2016/0036872 | A1 | 2/2016 | Lappin | |
| 2016/0112357 | A1 | 4/2016 | Lineberger et al. | |
| 2017/0173476 | A1* | 6/2017 | Schindler | A63F 13/71 |
| 2018/0253193 | A1 | 9/2018 | Zeng et al. | |

OTHER PUBLICATIONS client-portal.io [online], "How does Client Portal fit within your workflow?," 2019, [retrieved on Apr. 26, 2019], retrieved from: URL <https://client-portal.io/how-it-works/>, 5 pages.

dynamicsignal.com [online], "Product," 2019, [retrieved on Apr. 26, 2019], retrieved from: URL <https://dynamicsignal.com/product/>, 6 pages.

getbambu.com [online], "About," 2019, [retrieved on Apr. 26, 2019], retrieved from: URL <getbambu.com/about/>, 5 pages.

help.wechat.com [online], "Welcome to WeChat," 2019, [retrieved on Apr. 26, 2019], retrieved from: URL<https://help.wechatcom/cgi-bin/micromsg-bin/oshelpcenter?opcode=2&lang=en&plat=android&id=1703037JBzqu1703037vue22&Channel= WeChatOfficialWebsite>, 1 page.

huddle.com [online], "Transform the way you work," 2019, [retrieved on Apr. 26, 2019], retrieved from: URL <https://www.huddle.com/product/>, 6 pages.

kik.com [online], "About," 2019, [retrieved on Apr. 26, 2019], retrieved from: URL <https://www.kik.com/about/>, 3 pages.

m.io [online], "How Mio Works," 2019, [retrieved on Apr. 26, 2019], retrieved from: URL <https://m.io/how-it-works>, 4 pages.

medici.md [online], "About Medici," 2019, [retrieved on Apr. 26, 2019], retrieved from: URL <https://medici.md/about/>, 4 pages.

onehub.com [online], "Be unbelievably productive," 2019, [retrieved on Apr. 26, 2019], retrieved from: URL <https://www.onehub.com/features>, 9 pages.

signal.org [online], "Signal," 2019, [retrieved on Apr. 26, 2019], retrieved from: URL <https://wwwsignal.org/>, 3 pages.

smartvault.com [online], "Features," 2019, [retrieved on Apr. 26, 2019], retrieved from: URL <https://www.smartvault.com/features/>, 17 pages.

socialchorus.com [online], "About," 2019, [retrieved on Apr. 26, 2019], retrieved from: URL <https://www.socialchorus.com/about/>, 8 pages.

suitedash.com [online], "Features," 2019, [retrieved on Apr. 26, 2019], retrieved from: URL <https://suitedash.com/features/secure-client-portals/>, 9 pages.

threema.ch [online], "What makes Threema special?," 2019, [retrieved on Apr. 26, 2019], retrieved from: URL <https://threema.ch/en/faq/special_because>, 2 pages.

viber.com [online], "About Viber," 2019, [retrieved on Apr. 26, 2019], retrieved from: URL <hhttps://www.viber.com/about/>, 2 pages.

wrinkl.com [online], "Conversations with context," 2019, [retrieved on Apr. 26, 2019], retrieved from: URL <https://www.wrinkl.com/>, 6 pages.

* cited by examiner

COMPUTER SYSTEM FOR ASSEMBLING GRAPHICAL USER INTERFACES FROM DYNAMIC DATA

CLAIM OF PRIORITY

This application is a continuation application of U.S. application Ser. No. 16/368,549, filed on Mar. 28, 2019, which claims priority to U.S. Provisional Application Ser. No. 62/655,528, filed on Apr. 10, 2018, the entire contents of which are hereby incorporated by reference.

TECHNICAL FIELD

The present document relates to the creation of graphical user interfaces from dynamic data such as from a database.

BACKGROUND

Computers are devices that can be instructed to carry out sets of arithmetic or logical operations. Many computers use hardware configured to follow a sequence of operations, often called a program. Most programs receive input data, process the data, and provide output data. A database is an organized collection of data. For example, a relational database includes a collection of schemas, tables, queries, reports, views, and other elements.

SUMMARY

A computer system allows a user such as an account manager to prepare a collection of webpages that, when prepared for a recipient, look like a chronologically-ordered news-feed such as is often found in social media webpages, news-reading applications, email applications, etc. However, the computer system allows the user control to edit, update, and arrange the posts in the feed so that the user can control the ordering of the feed. In this way, a user can advantageously prepare a web page that will display information in a familiar newsfeed-like format, but that user advantageously be provided with webpage building and editing tools that are easy and efficient to use. For example, the user can directly select the order of items to be displayed in the newsfeed and not, for example, artificially edit timestamps for items in order to force them into a particular presentation order.

In one aspect, a system includes a server configured to receive, from a first user device, information for a debrief-object. The server is further configured to generate a debrief-object from the information for a debrief-object. The server is further configured to generate a post-object containing the debrief-object. The server is further configured to associate the generated post-object with a newsfeed-object that contains a plurality of other post-objects. The server is further configured to generate an interface to render the newsfeed-object such that the generated post-object and the other post-objects are displayed in an order other than the chronological order created. The server is further configured to serve, to a second user device, the interface. The system further includes the first user device configured to transmit, to the server, the information for the debrief-object. The system further includes the second user device configured to display the newsfeed-object such that the generated post-object and the other post-objects are displayed in an order other than the chronological order created. Systems, methods, devices, and computer-readable media are also possible.

Implementations can include any, all, or none of the following features. The system configured to transmit, to the server, second information specifying an ordering of post-objects in the newsfeed-object; the server is further configured to associate ordering information with the newsfeed-object; and the second user device is configured to display the newsfeed-object according to the ordering information. The first user devices is further configured to present a graphical user interface (GUI) that allows a user to define the second information. One of the debrief-objects includes a plurality of numerical values and an associated Boolean indicator for each numerical value; and wherein, to display the display the newsfeed-object, the second user device displays, in a single display of a post-object, the plurality of numerical values each next to one of two possible symbols representative of the associated Boolean indicator. One of the debrief-objects includes user-generated text having user-selected formatting and wherein, to display the display the newsfeed-object, the second user device displays, in a single display of a post-object, the user-generated text formatted according to the user-selected formatting. To receive, from a first user device, information for a debrief-object, the server is further configured to: provide a list of possible contacts associated with an organization; receive an indication of a proper subset of the possible contacts associated with the organization; and wherein the second user device is associated with one of the indicated possible contacts associated with the organization. To generate a post-object containing the debrief-object, the server is configured to access a second debrief-object and to generate the post-object from both the debrief-object and the second debrief object.

Implementations can include some, none, or all of the following advantages. By allowing a user to specify the order of items displayed in a newsfeed, greater flexibility in the automatic generation of user interfaces is advantageously provided. For example, a user can generate items for the newsfeed based on information as it becomes available, and then organize the newsfeed to display items out of chronological order but in an order that matches the authors preferred ordering.

DESCRIPTION OF DRAWINGS

FIGS. 2-9 are example user interfaces

Like reference symbols in the various drawings indicate like elements

DETAILED DESCRIPTION

A computer system, such as a content management system, can be configured so that the contents are displayed in user interfaces in newsfeed formats. The newsfeed can include a listing of posts. The ordering and contents of the posts in the newsfeeds may be directly controlled by a webpage designer according to the order desired by the designer. That is, they may not need to be in, for example, reverse chronological order. New posts may be published lower than the top-entry position, may be rearranged, etc.

These newsfeeds may then be communicated to other users. For example, an account manager may generate webpages for an account holder and populate the webpages with information pertinent to the account holder's account. A news organization may organize a newsfeed such that important, breaking, or otherwise selected stories are displayed higher than newer stories. A video game designer may generate, for use in a video game setting, newsfeeds that are made to appear in chronological order but that can be written in a different order that the designer finds to be more productive.

Figure 1:
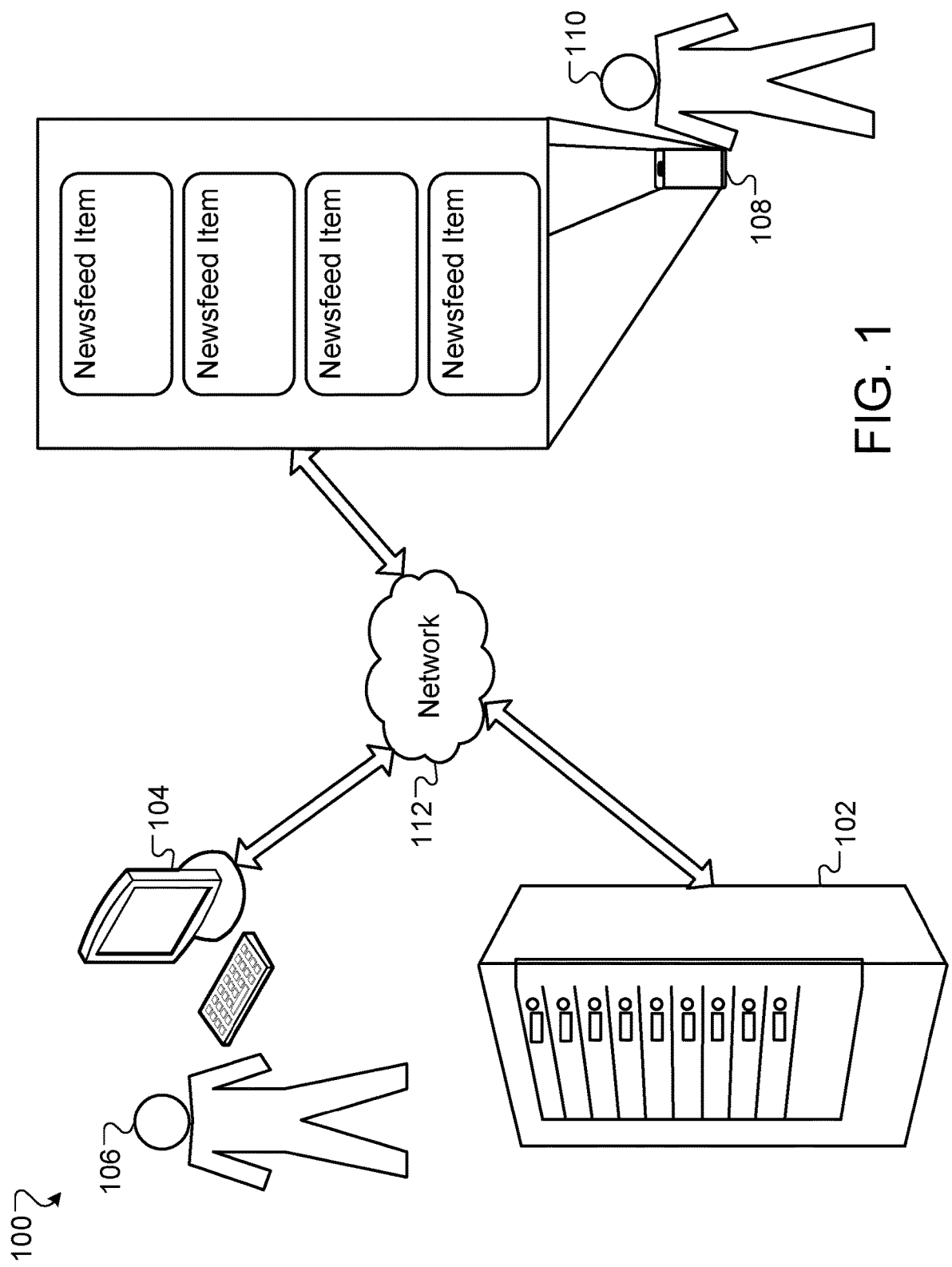
FIG. 1 block diagram of an example system for generating and displaying user interfaces in which posts in a newsfeed are arranged in an order selected by the user.

FIG. 1 block diagram of an example system 100 for generating and displaying user interfaces in which posts in a newsfeed are arranged in an order selected by the user. In the system 100, a server 102 stores and severs data to other computing systems. A computer 104 is used by a user 106 to access the server 102, and a computer 108 is used by a user 110 to access the server 102. A network 112 (e.g., the Internet) is used to facilitate data communication.

Although a particular number and type of elements are shown, a different number and type of elements may be used for the same or similar purpose. For example, the computer 104 is shown as a desktop computer and the computer 108 is shone as a phone, but these could be any appropriate computing devices capable of accessing the server 102. The server 102 may be a single physical server, a virtual machine, etc.

The server 102 can offer a customer relationship management (CRM) interface to the user 106. For example, the server 102 can generate webpages to be displayed in a web browser by the computer 104 for the user 106 to interact with. These interfaces may be used by the user 106 to perform CRM-related tasks such as manage communications, generate reports, and as will be described in this document, generate webpages containing newsfeeds. Examples of these interfaces will be described below.

The server 102 can offer webpages to the user 110. For example, webpages authored by the user 106 can be served to the computer 108 for rendering in display to the user 106. These webpages can include webpages containing newsfeed items that have been authored by the user 106.

FIGS. 2-9 are example user interfaces 200-900. For example, the user interfaces 200-900 can be used by the server 102 and served to the computers 104 and/or 108.

Figure 2:
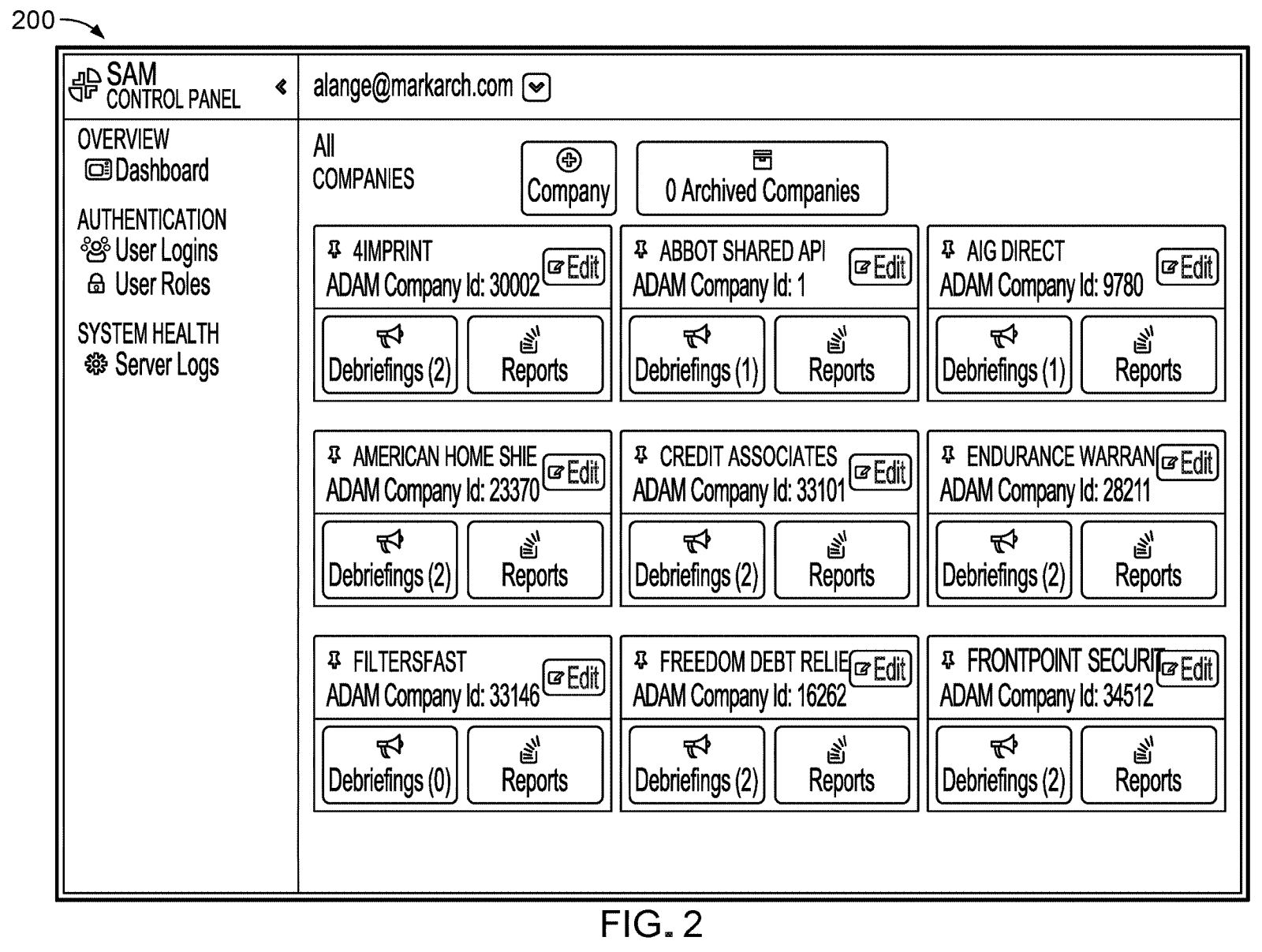

FIG. 2 shows a user interface 200 that can be used by a CRM system. In the user interface 200, a user is presented with user interface elements (e.g., buttons), one for each of a plurality of different customers or clients that the user interacts with. The user can select (e.g., click or tap) one of the interface elements to bring up information related to that particular customer.

Each customer's user interface element can include interfaces elements to bring up information about debriefings for that customer and to bring up reports for that customer. Interacting with the report element can bring a user to a new interface in which past reports can be viewed and new reports can be generated or requested. Report, generally, are static documents that are created one and then are not changed. These reports may be run on a regular basis (e.g., a billing report every billing cycle) or on an as needed basis (e.g., in response to a user request). These reports sent, for example by email or parcel mail, to a customer and/or used internally. As an unchanging document tied to a point in time, reports may be useful for recordkeeping purposes.

Figure 3:
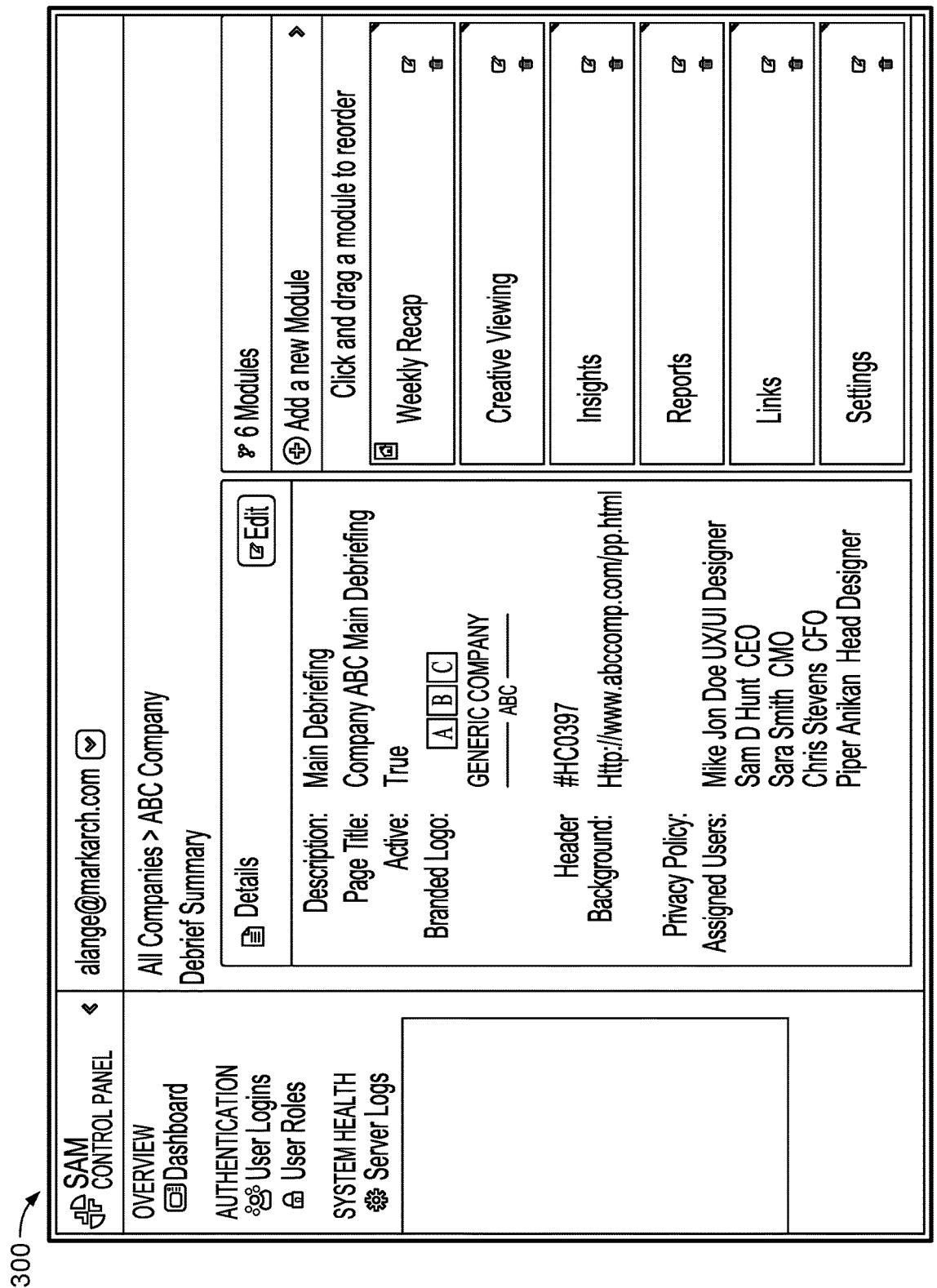

Interacting with the debriefing element can bring a user to a new interface such as user interface 300. FIG. 3 shows the user interface 300. In the user interface 300, a user is presented with a debrief summary for the customer that was selected. Generally speaking, debriefs can include content that is to be shown within a post within a newsfeed. In some implementations, each post within a timeline can contain one and only one debrief. In some implementations, posts within a timeline can contain one or more debriefs. Generally speaking, a debrief is a shorter, dynamic snippet of information that the user would like to communicate to a customer. For example, a debrief for customer may show a snapshot of the most recent day's sales or advertisement performance. This information is not intended to be archived for long-term storage like a report, but instead may be, for example, generated from information that also is in a report. But this information can be communicated as part of a larger narrative and presented in a different way. For example, some aspect of the information may be called out graphically, information may be presented in a way intended to be understood in a particular way, etc.

Interface 300 provides the user with an edit area that can be prepopulated with one or more templates. The user may use this are to author a debrief that contains some information to be displayed to a customer. The template may be loaned to assist the user in the authoring process. A shown here, company assets (e.g., images) and appearance parameters (e.g., color values) can be loaded into the edit area.

The interface 300 also provides the user with access to topical newsfeeds related to the customer. In this example, the topical newsfeeds include "Weekly Recap," "Creative Writing," "Insights," "Links," and "Settings," though other topical newsfeeds may be used for any particular customer. When a user creates a debrief, they may designate one or more topical newsfeeds for the debrief to be shown in.

Figure 4:
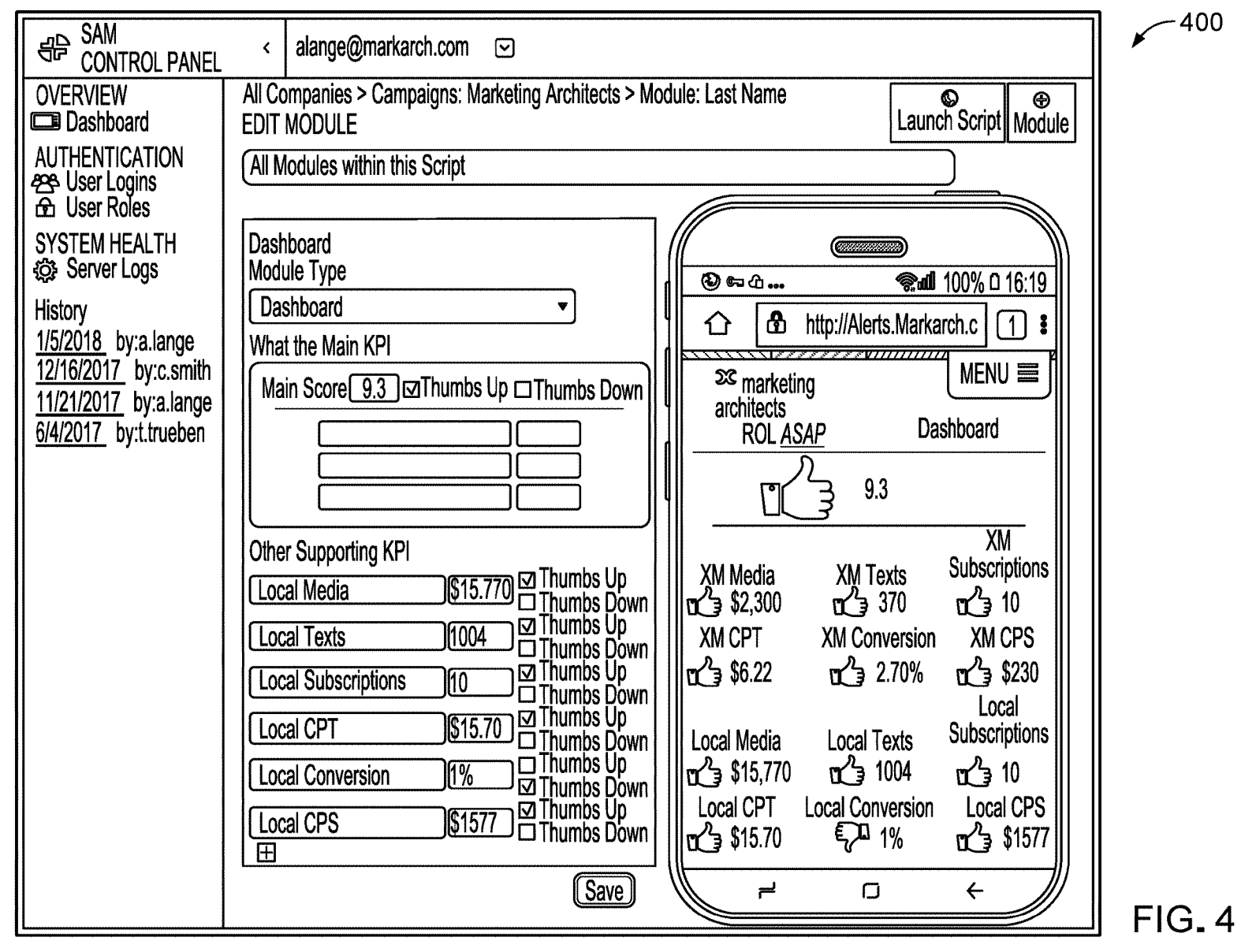

FIG. 4 shows an example interface 400 in which a user is using a custom edit area to create a particular kind of debrief called a dashboard debrief. A dashboard debrief is authored in order to provide a recipient with a quick overview of some collection of values. In this case, advertising performance is presented in a dashboard. Advertising values are displayed alongside colored icons in order to help a reader quickly understand the implications of the values shown.

Because a dashboard can be advantageously presented in a consistent format, a template may be used to quickly and efficiently author a dashboard debrief. As shown here, the template include a plurality of fields that the author may populate with values in order to author the dashboard.

User interfaces 400 can also include a preview pane that shows a preview of the debrief before it is sent. The preview pain can show, for example, how the debrief will appear when rendered for a recipient. This can aid the author as they author the debrief, to help them understand how their debrief will appear. This can allow the author to edit their debrief to ensure the desired appearance is achieved.

Figure 5:
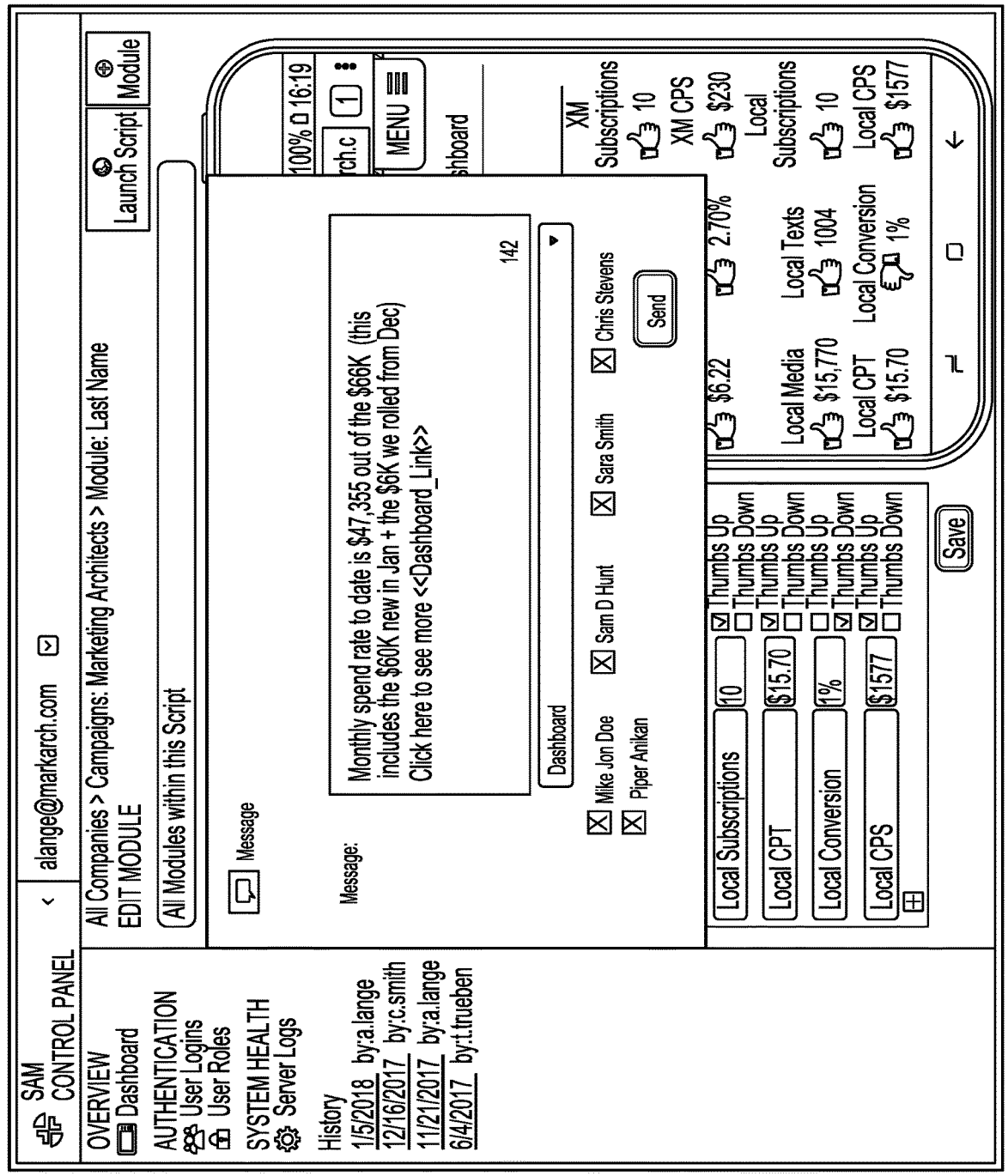

FIG. 5 shows an example interface 500 in which a user is preparing to send a message to message to a recipient to let the recipient know that a new debrief is ready for their viewing. The user can select an interface element in order to gain access to a message-drafting interface. The message-drafting interface can allow the user to author a message to be sent to one or more recipients. The message-drafting interface can include an area for the user to type text to be included into the message. A link may be included and specified with a dropdown box. Importantly, the link does not need to be a link directly to the debrief that is being authored. In this example, the link will be generated for the topical newsfeed in which the debrief will be located.

In the interface, the user is provided with interface elements to include or exclude certain recipients. The list of possible recipients can be populated from stored data indicating which recipients should receive updates. The author can select some or all of the recipients to receive the message. Once selected and the message is sent, each recipient can receive the message.

In some implementations, the recipients can receive the messages according to preferences that have been set for each recipient. For example, one recipient may be associated with a text message format and will receive the message as a text message. One recipient may be associated with an application-notification format and may receive the message as an application notification. One recipient may be associated with an email format and receive the message as an email.

Figure 6:
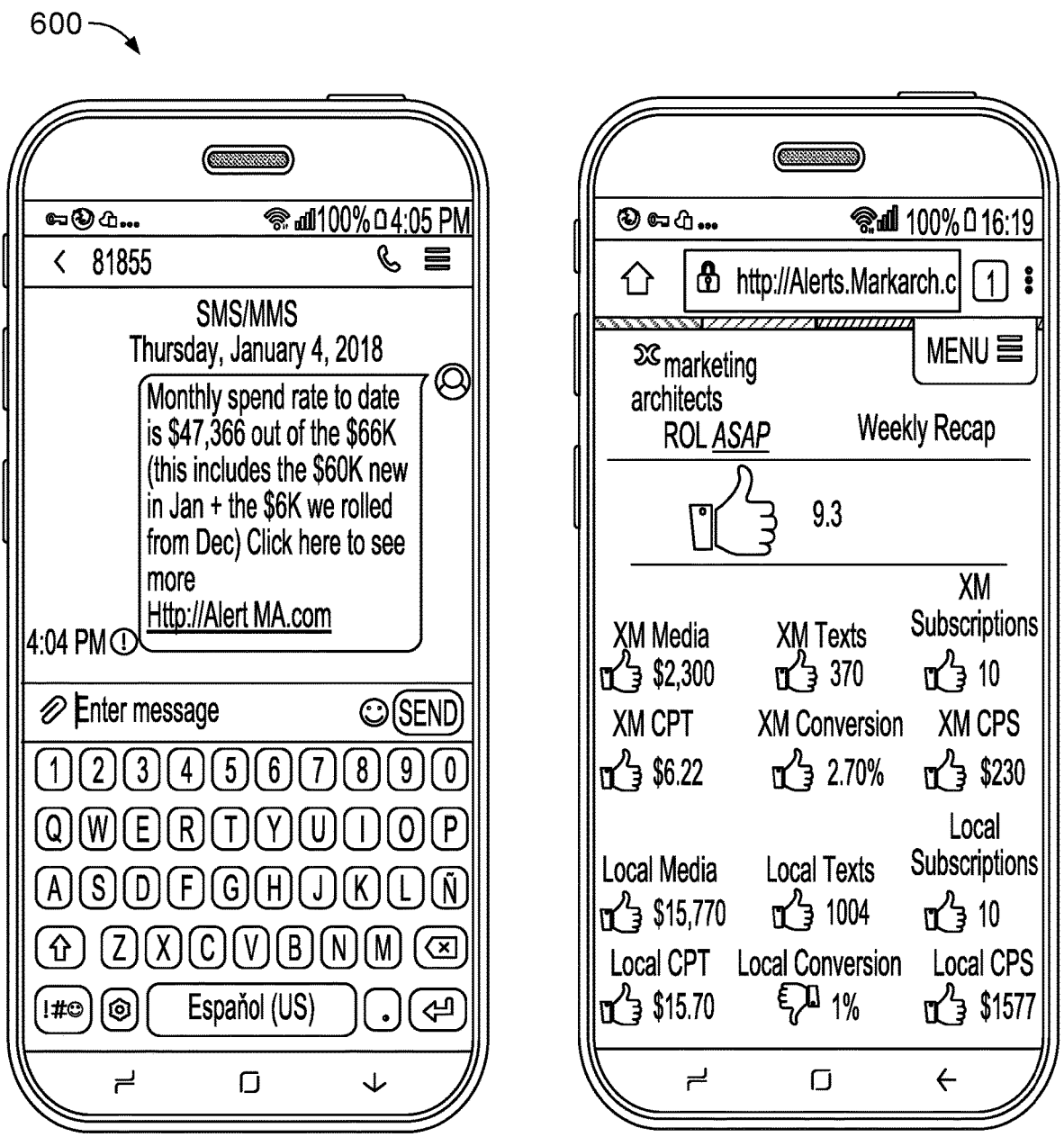

FIG. 6 shows an example interface 600. In the interface 600, the debrief message is shown to the user in their preferred communication channel. In this example, the user has selected text-messages, so the message has been received as an SMS. The SMS contains a link that, when selected, brings the user to a rendering of the debrief in a web browser. Although SMS and web browsers are shown in this example, other applications can present the interface 600. For example, a dedicated application can be used to show the message and the debrief.

Figure 7:
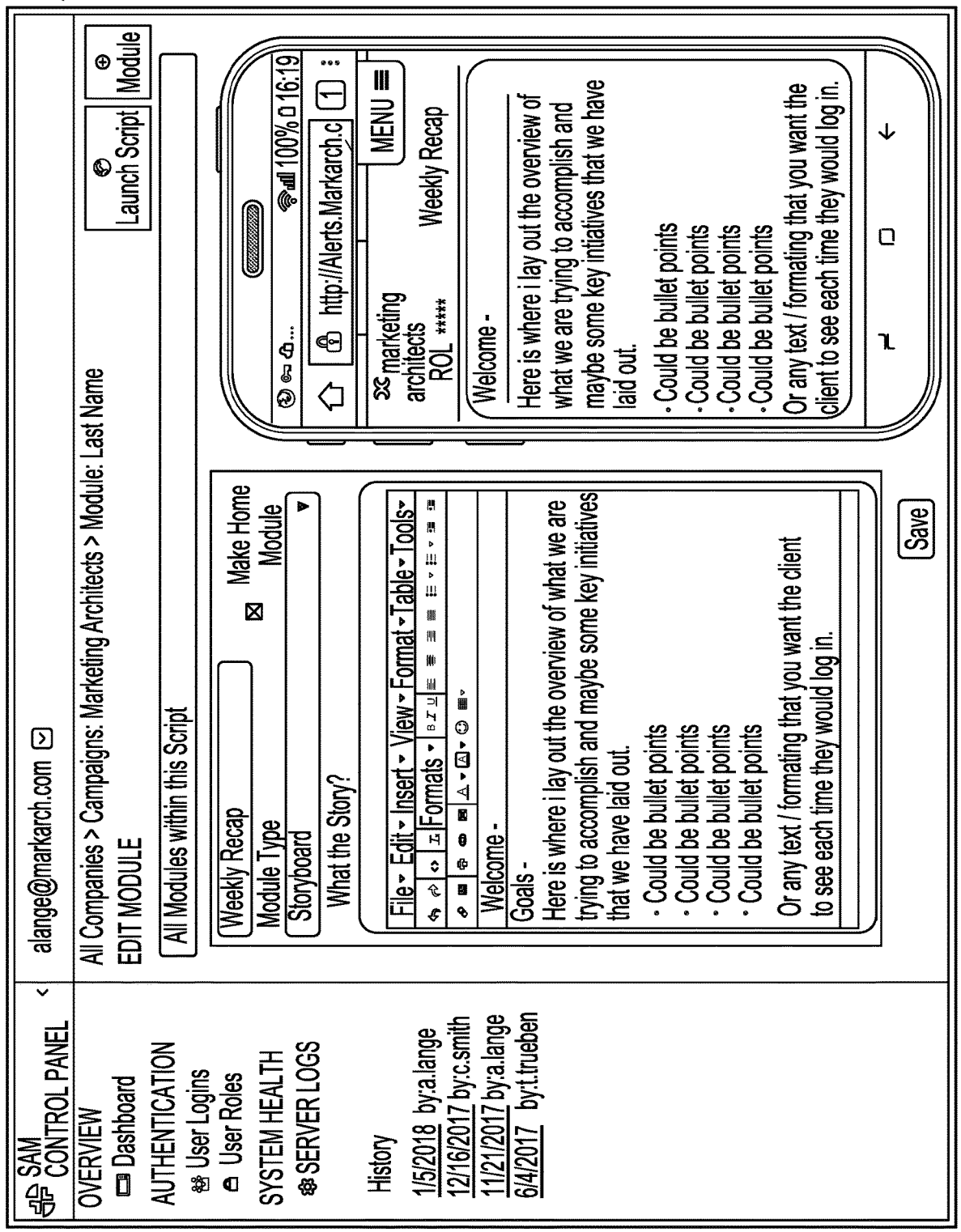

FIG. 7 shows an example interface 700. In the interface 700, the user is authoring a different debrief using a more free-form text editor. In this example, the user is presented with a text field into which they can type. The text editing can be augmented with stylistic improvements and insertion of complex text or other components. For example, the user can be presented with user interface elements that, when selected, allow the user to change the formatting of the text. For example, the user can be presented with user interface elements that, when selected, insert links, multimedia, or other elements into the text.

A preview pane is shown to show the user how their text will appear when rendered. This information can allow the user to make on-the-fly updates to their text to ensure it conforms to their desired appearance.

Figure 8:
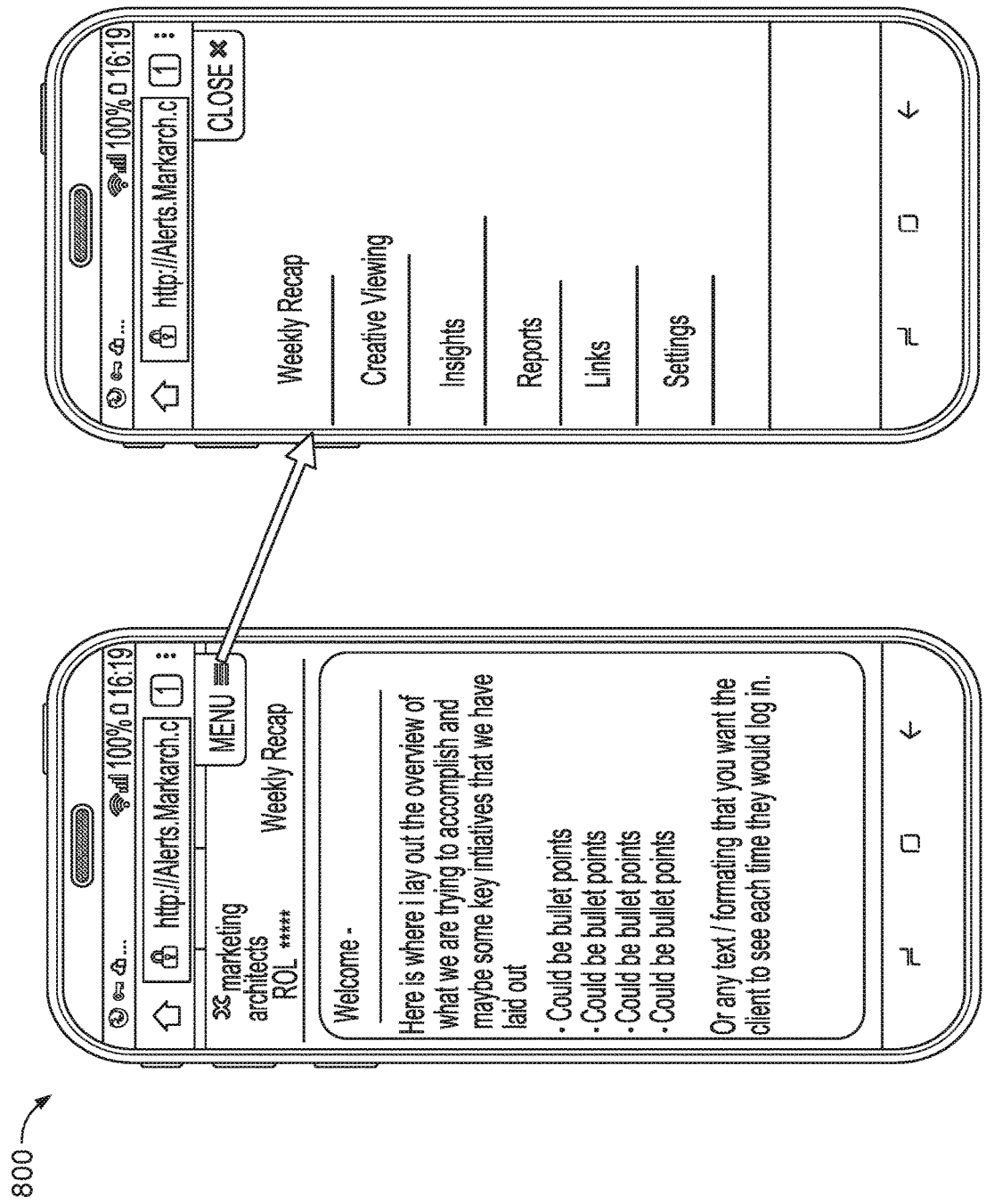

FIG. 8 shows an example interface 800. In the interface 800, the user is presented with the displayed debrief, which is placed into a post in one of many topical newsfeeds. In this example, the debrief is of a type "Weekly Recap," and as such can be placed into the "Weekly Recap" news feed. This news feed may be used, for example, by the author to provide a newsfeed of items to be communicated.

The topical newsfeed contents may be authored and arranged in any order desired by the author, include an order different from the chronological order in which they were authored. For example, after creating the dashboard post, the author may be interested in providing supporting or supplemental information. The author may then create another post containing two debriefs, one debrief with information about state-by-state information presented in a heat map and one debrief containing a response curve. The user may then, after this second post is created, which to also create another post with some breaking news known to the author.

Instead of being forced to display the topical newsfeed with the posts displayed in the order created, the author can instead rearrange the posts in the topical newsfeed. For example, the user may interact with one or more user interface elements in order to arrange the order of posts so that the weekly recap is first and the heatmap/response curve is last.

Figure 9:
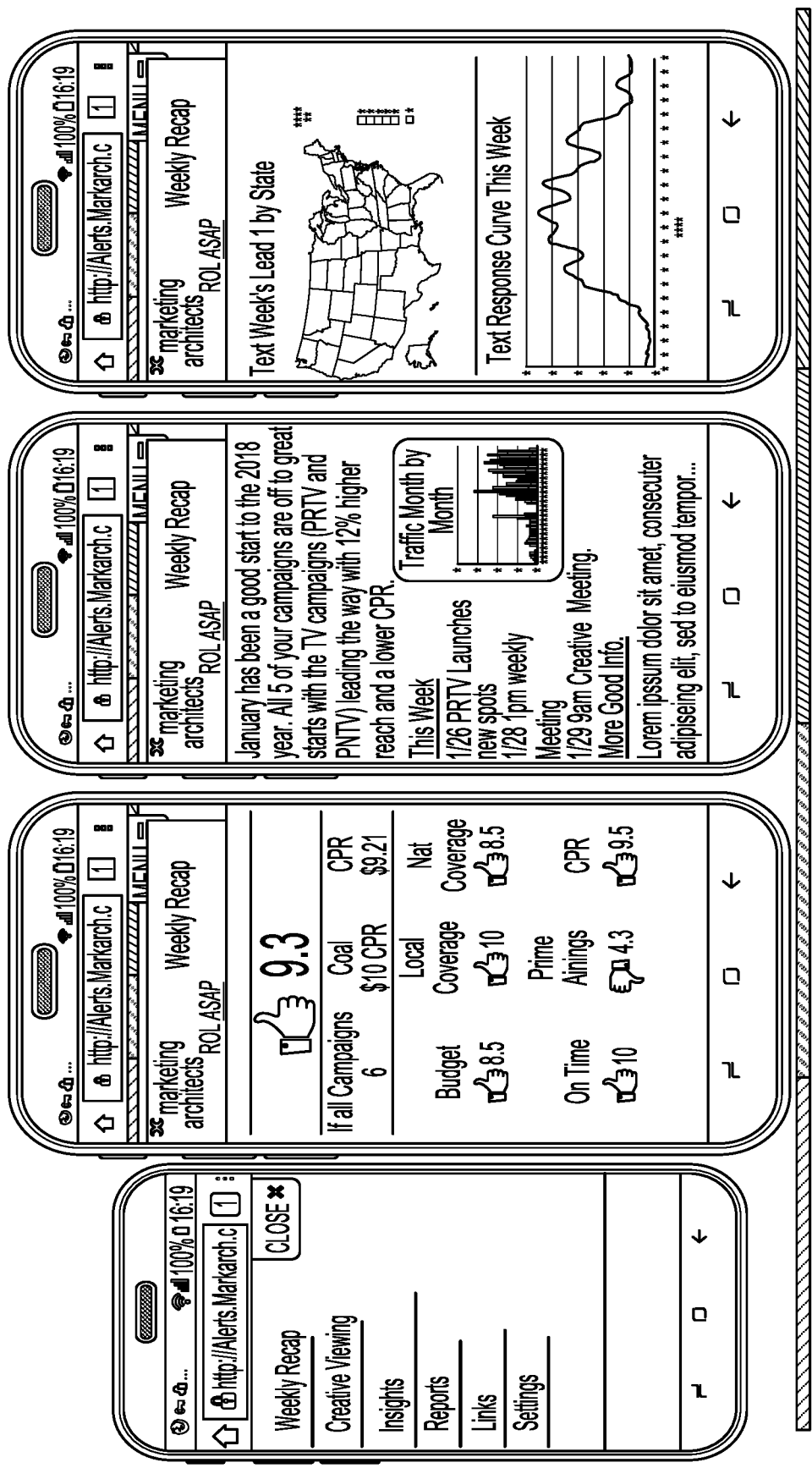

FIG. 9 shows an interface 900 in which the "Weekly Recap" topical newsfeed is presented in the author's desired order. As the recipient user scrolls through the topical newsfeed, they are presented first with the dashboard. The recipient can scroll down further and see the breaking news post. The recipient can scroll down further and see the heatmap/response curve post.

Figure 10:
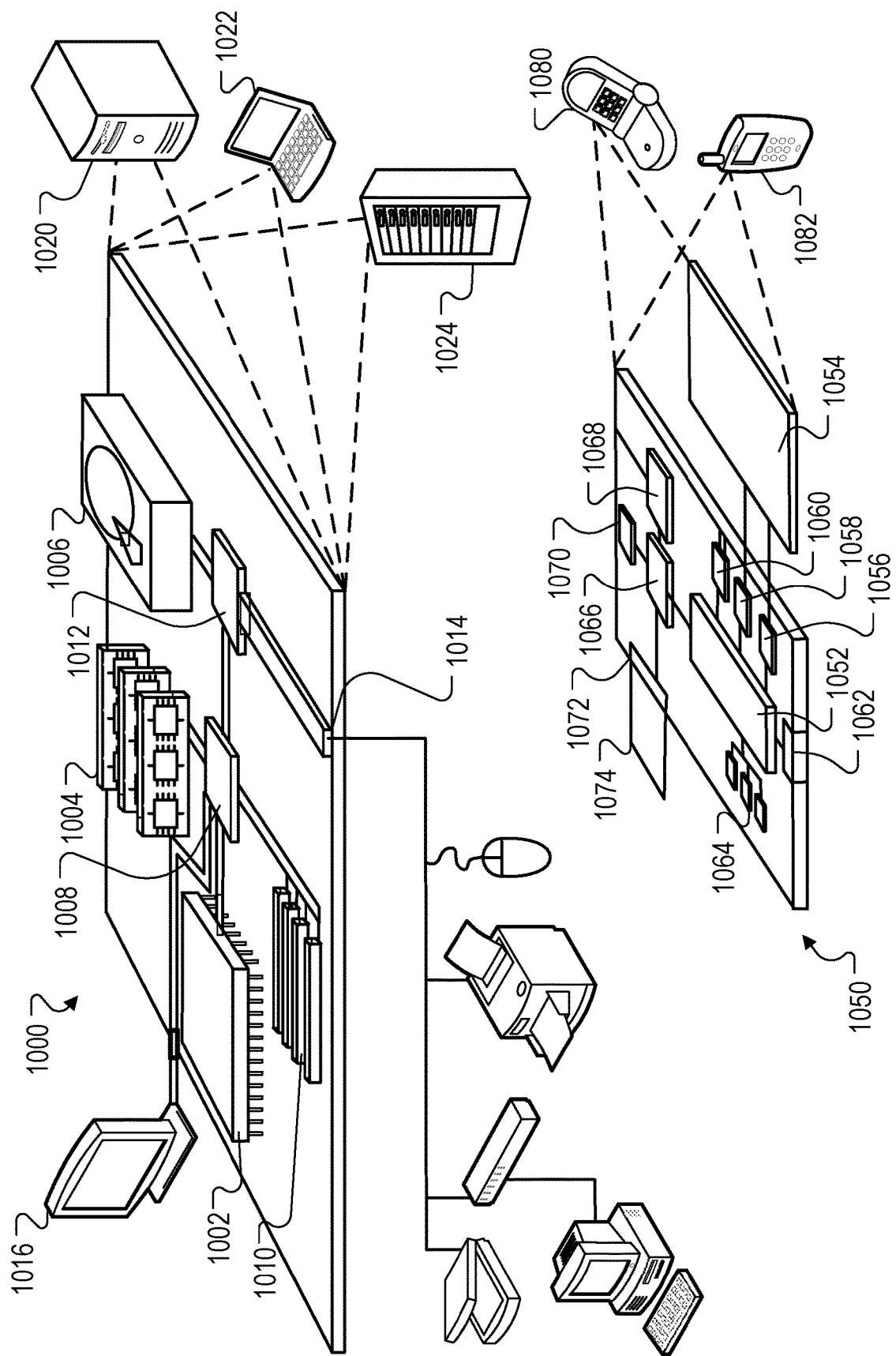
FIG. 10 shows an example of a computing device 1000 and an example of a mobile computing device that can be used to implement the techniques described here.

FIG. 10 shows an example of a computing device 1000 and an example of a mobile computing device that can be used to implement the techniques described here. The computing device 1000 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 may also be another form of computer-readable medium, such as a magnetic or optical disk.

The storage device 1006 is capable of providing mass storage for the computing device 1000. In some implementations, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 1004, the storage device 1006, or memory on the processor 1002.

The high-speed interface 1008 manages bandwidth-intensive operations for the computing device 1000, while the low-speed interface 1012 manages lower bandwidth-intensive operations. Such allocation of functions is exemplary only. In some implementations, the high-speed interface 1008 is coupled to the memory 1004, the display 1016 (e.g., through a graphics processor or accelerator), and to the high-speed expansion ports 1010, which may accept various expansion cards (not shown). In the implementation, the low-speed interface 1012 is coupled to the storage device 1006 and the low-speed expansion port 1014. The low-speed expansion port 1014, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. In addition, it may be implemented in a personal computer such as a laptop computer 1022. It may also be implemented as part of a rack server system 1024. Alternatively, components from the computing device 1000 may be combined with other components in a mobile device (not shown), such as a mobile computing device 1050. Each of such devices may contain one or more of the computing device 1000 and the mobile computing device 1050, and an entire system may be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 may also be provided with a storage device, such as a micro-drive or other device, to provide additional storage. Each of the processor 1052, the memory 1064, the display 1054, the communication interface 1066, and the transceiver 1068, are interconnected using various buses, and several of the components may be mounted on a common motherboard or in other manners as appropriate.

The processor 1052 can execute instructions within the mobile computing device 1050, including instructions stored in the memory 1064. The processor 1052 may be implemented as a chipset of chips that include separate and multiple analog and digital processors. The processor 1052 may provide, for example, for coordination of the other components of the mobile computing device 1050, such as control of user interfaces, applications run by the mobile computing device 1050, and wireless communication by the mobile computing device 1050.

The processor 1052 may communicate with a user through a control interface 1058 and a display interface 1056 coupled to the display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may provide communication with the processor 1052, so as to enable near area communication of the mobile computing device 1050 with other devices. The external interface 1062 may provide, for example, for wired communication in some implementations, or for wireless communication in other implementations, and multiple interfaces may also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 may also be provided and connected to the mobile computing device 1050 through an expansion interface 1072, which may include, for example, a SIMM (Single In Line Memory Module) card interface. The expansion memory 1074 may provide extra storage space for the mobile computing device 1050, or may also store applications or other information for the mobile computing device 1050. Specifically, the expansion memory 1074 may include instructions to carry out or supplement the processes described above, and may include secure information also. Thus, for example, the expansion memory 1074 may be provide as a security module for the mobile computing device 1050, and may be programmed with instructions that permit secure use of the mobile computing device 1050. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1064, the expansion memory 1074, or memory on the processor 1052. In some implementations, the computer program product can be received in a propagated signal, for example, over the transceiver 1068 or the external interface 1062.

The mobile computing device 1050 may communicate wirelessly through the communication interface 1066, which may include digital signal processing circuitry where necessary. The communication interface 1066 may provide for communications under various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1068 using a radio-frequency. In addition, short-range communication may occur, such as using a Bluetooth, WiFi, or other such transceiver (not shown). In addition, a GPS (Global Positioning System) receiver module 1070 may provide additional navigation- and location-related wireless data to the mobile computing device 1050, which may be used as appropriate by applications running on the mobile computing device 1050.

The mobile computing device 1050 may also communicate audibly using an audio codec 1060, which may receive spoken information from a user and convert it to usable digital information. The audio codec 1060 may likewise generate audible sound for a user, such as through a speaker, e.g., in a handset of the mobile computing device 1050. Such sound may include sound from voice telephone calls, may include recorded sound (e.g., voice messages, music files, etc.) and may also include sound generated by applications operating on the mobile computing device 1050.

The mobile computing device 1050 may be implemented in a number of different forms, as shown in the figure. For example, it may be implemented as a cellular telephone

1080. It may also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method comprising:
receiving, through a graphical user interface (GUI), a first user input from a user to create a first newsfeed-object;
generating, in response to receiving the first user input, the first newsfeed-object in a computer memory;
receiving, through the GUI and after receiving the first user input, a second user input from the user to create a second newsfeed-object;
generating, in response to receiving the second user input, the second newsfeed-object in the computer memory;
collecting a plurality of newsfeed-objects from the computer memory, the plurality of newsfeed-objects including the first newsfeed-object and the second newsfeed-object;
displaying the collected plurality of newsfeed-objects in the GUI in a default order that includes the first newsfeed object being displayed before the second newsfeed-object;
after displaying the collected plurality of newsfeed-objects in the GUI in the default order, receiving, through a reorder field displayed in the GUI that prompts the user to reorder the collected plurality of newsfeed-objects, third user input specifying a second order for the collected plurality of newsfeed-objects that is different from the default order such that the second newsfeed-object is displayed in the reorder field of the GUI before the first newsfeed-object; and
publishing the collected plurality of newsfeed-objects in the second order.

2. The method of claim 1, wherein the GUI dynamically displays the reordering of the newsfeed-objects as the second user input is received.

3. The method of claim 2, wherein the second user input is a click-and-drag input.

4. The method of claim 1, wherein the first user input from the user to create the first newsfeed-object and the second user input from the user to create the second newsfeed-object are received through template-elements of the GUI that provide a user with templates that can be populated with particular data to generate particular newsfeed-objects.

5. The method of claim 1, wherein said receiving, through the GUI and after receiving the first user input, the second user input from the user to create the second newsfeed-object, comprises:
displaying to the user a newsfeed-objects generation screen;
prompting the user in the newsfeed-objects generation screen for a plurality of particular inputs;
receiving the plurality of particular inputs from the user through the newsfeed-objects generation screen; and
generating the second newsfeed-object by applying the particular inputs to a particular template that is associated with the newsfeed-objects generation screen.

6. The method of claim 1, wherein publishing the plurality of newsfeed-objects in the second order comprises generating instructions that, when executed by a computing device, cause the computing device to:
render the plurality of newsfeed-objects in the second order.

7. The method of claim 6, wherein at least one of the rendered plurality of newsfeed-objects comprises an interactive element configured to received interaction input from a second user of the computing device.

8. The method of claim 7, wherein the t least one of the rendered plurality of newsfeed-objects is configured to, in response to receiving the interaction input, navigate the computing device to a different document to be rendered on the computing device.

9. A system comprising:
one or more processors; and
computer memory storing instructions that, when executed by the one or more processors, cause the one or more processors to perform operations comprising:
receiving, through a graphical user interface (GUI), a first user input from a user to create a first newsfeed-object;
generating, in response to receiving the first user input, the first newsfeed-object in a computer memory;
receiving, through the GUI and after receiving the first user input, a second user input from the user to create a second newsfeed-object;
generating, in response to receiving the second user input, the second newsfeed-object in the computer memory;
collecting a plurality of newsfeed-objects from the computer memory, the plurality of newsfeed-objects including the first newsfeed-object and the second newsfeed-object;
displaying the collected plurality of newsfeed-objects in the GUI in a default order that includes the first newsfeed object being displayed before the second newsfeed-object;
after displaying the collected plurality of newsfeed-objects in the GUI in the default order, receiving, through a reorder field displayed in the GUI that prompts the user to reorder the collected plurality of newsfeed-objects, third user input specifying a second order for the collected plurality of newsfeed-objects that is different from the default order such that the second newsfeed-object is displayed in the reorder field of the GUI before the first newsfeed-object; and
publishing the collected plurality of newsfeed-objects in the second order.

10. The system of claim 9, wherein the GUI dynamically displays the reordering of the newsfeed-objects as the second user input is received.

11. The system of claim 10, wherein the second user input is a click-and-drag input.

12. The system of claim 9, wherein the first user input from the user to create the first newsfeed-object and the second user input from the user to create the second newsfeed-object are received through template-elements of the GUI that provide a user with templates that can be populated with particular data to generate particular newsfeed-objects.

13. The system of claim 9, wherein said receiving, through the GUI and after receiving the first user input, the second user input from the user to create the second newsfeed-object, comprises:
displaying to the user a newsfeed-objects generation screen;
prompting the user in the newsfeed-objects generation screen for a plurality of particular inputs;
receiving the plurality of particular inputs from the user through the newsfeed-objects generation screen; and
generating the second newsfeed-object by applying the particular inputs to a particular template that is associated with the newsfeed-objects generation screen.

14. The system of claim 9, wherein publishing the plurality of newsfeed-objects in the second order comprises generating instructions that, when executed by a computing device, cause the computing device to:
render the plurality of newsfeed-objects in the second order.

15. The system of claim 14, wherein at least one of the rendered plurality of newsfeed-objects comprises an interactive element configured to received interaction input from a second user of the computing device.

16. The system of claim 15, wherein the t least one of the rendered plurality of newsfeed-objects is configured to, in response to receiving the interaction input, navigate the computing device to a different document to be rendered on the computing device.

17. A non-transitory computer-readable medium tangibly-storing instructions that, when executed by one or more processors, cause the one or more processors to perform operations comprising:
receiving, through a graphical user interface (GUI), a first user input from a user to create a first newsfeed-object;
generating, in response to receiving the first user input, the first newsfeed-object in a computer memory;
receiving, through the GUI and after receiving the first user input, a second user input from the user to create a second newsfeed-object;
generating, in response to receiving the second user input, the second newsfeed-object in the computer memory;
collecting a plurality of newsfeed-objects from the computer memory, the plurality of newsfeed-objects including the first newsfeed-object and the second newsfeed-object;
displaying the collected plurality of newsfeed-objects in the GUI in a default order that includes the first newsfeed object being displayed before the second newsfeed-object;
after displaying the collected plurality of newsfeed-objects in the GUI in the default order, receiving, through a reorder field displayed in the GUI that prompts the user to reorder the collected plurality of newsfeed-objects, third user input specifying a second order for the collected plurality of newsfeed-objects that is different from the default order such that the second newsfeed-object is displayed in the reorder field of the GUI before the first newsfeed-object; and
publishing the collected plurality of newsfeed-objects in the second order.

18. The computer-readable medium of claim 17, wherein the GUI dynamically displays the reordering of the newsfeed-objects as the second user input is received.

19. The computer-readable medium of claim 17, wherein the first user input from the user to create the first newsfeed-object and the second user input from the user to create the second newsfeed-object are received through template-elements of the GUI that provide a user with templates that can be populated with particular data to generate particular newsfeed-objects.

20. The computer-readable medium of claim 17, wherein said receiving, through the GUI and after receiving the first user input, the second user input from the user to create the second newsfeed-object, comprises:
displaying to the user a newsfeed-objects generation screen;
prompting the user in the newsfeed-objects generation screen for a plurality of particular inputs;
receiving the plurality of particular inputs from the user through the newsfeed-objects generation screen; and
generating the second newsfeed-object by applying the particular inputs to a particular template that is associated with the newsfeed-objects generation screen.

* * * * *

UNITED STATES PATENT AND TRADEMARK OFFICE
CERTIFICATE OF CORRECTION

PATENT NO. : 11,079,905 B2
APPLICATION NO. : 16/986774
DATED : August 3, 2021
INVENTOR(S) : Aaron Lange Page 1 of 1

It is certified that error appears in the above-identified patent and that said Letters Patent is hereby corrected as shown below:

In the Claims

In Column 10, Line 63, In Claim 8, delete "t least" and insert -- at least --, therefor.

In Column 12, Line 5, In Claim 16, delete "t least" and insert -- at least --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*